(12) United States Patent
Binder et al.

(10) Patent No.: US 10,305,271 B2
(45) Date of Patent: May 28, 2019

(54) MULTI-PACK AND COMPONENT CONNECTIVITY DETECTION

(71) Applicants: Julian Binder, Sunnyvale, CA (US); Daniel Chian, Los Altos, CA (US)

(72) Inventors: Julian Binder, Sunnyvale, CA (US); Daniel Chian, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 371 days.

(21) Appl. No.: 15/199,799

(22) Filed: Jun. 30, 2016

(65) Prior Publication Data
US 2018/0006444 A1    Jan. 4, 2018

(51) Int. Cl.
*H02H 3/00* (2006.01)
*H02H 3/08* (2006.01)
(Continued)

(52) U.S. Cl.
CPC .......... *H02H 3/006* (2013.01); *H01M 10/425* (2013.01); *H02H 11/00* (2013.01);
(Continued)

(58) Field of Classification Search
CPC ............ H01M 10/425; H01M 2220/30; H02H 3/006; H02H 3/08; H02H 5/10; H02H 7/18; H02H 11/00
(Continued)

(56) References Cited

U.S. PATENT DOCUMENTS 5,068,604 A   11/1991   Van De Lagemaat
6,051,955 A    4/2000   Saeki et al.
(Continued)

FOREIGN PATENT DOCUMENTS

CN    104578239 A    4/2015
WO    WO2014181066 A1    11/2014

OTHER PUBLICATIONS

"International Search Report and Written Opinion Issued in PCT Application No. PCT/US2017/037101", dated Aug. 2, 2017, 12 pages.
(Continued)

*Primary Examiner* — Kevin J Comber
(74) *Attorney, Agent, or Firm* — Newport IP, LLC; Scott Y. Shigeta

(57) ABSTRACT

Techniques for enabling multi-pack and component connectivity detection are provided. In some configurations, individual PCMs can test the connectivity between components of a device without the need to operate the components. For example, PCMs configured in accordance with the present disclosure can test the connectivity between a motherboard, a display circuit, a camera, and a number of battery packs without the need to operate the motherboard, display circuit, camera, etc. In some configurations, conductors that are part of cables and connectors used to connect the components can be used to determine the state of one or more connections. When a signal that runs through the conductors meets one or more criteria, the PCMs of a device cause a predetermined delay prior to enabling one or more components. By testing the connectivity between components before each component transitions to an operational state, other problems caused by faulty connections can be mitigated.

20 Claims, 6 Drawing Sheets

(51) Int. Cl.
   *H02H 5/10*   (2006.01)
   *H02H 7/18*   (2006.01)
   *H01M 10/42*  (2006.01)
   *H02H 11/00*  (2006.01)

(52) U.S. Cl.
   CPC ........... *H01M 2220/30* (2013.01); *H02H 3/08* (2013.01); *H02H 5/10* (2013.01); *H02H 7/18* (2013.01)

(58) Field of Classification Search
   USPC .......................................................... 361/78
   See application file for complete search history.

(56) References Cited

U.S. PATENT DOCUMENTS

| | | |
   |---|---|---|
   | 6,586,911 B1 | 7/2003 | Smith et al. |
   | 7,009,363 B2 | 3/2006 | Beals et al. |
   | 7,537,720 B2 | 5/2009 | Moon |
   | 8,797,043 B2 | 8/2014 | Laber et al. |
   | 8,907,676 B2 | 12/2014 | Coenen |
   | 2006/0226814 A1 | 10/2006 | Formenti et al. |
   | 2008/0144241 A1 | 6/2008 | Crawley et al. |
   | 2008/0192399 A1 | 8/2008 | Chen |
   | 2009/0190273 A1 | 7/2009 | Moran et al. |
   | 2009/0230922 A1 | 9/2009 | Elder et al. |
   | 2011/0057658 A1 | 3/2011 | Yugou et al. |
   | 2011/0121783 A1 | 5/2011 | Boyles et al. |
   | 2011/0228429 A1* | 9/2011 | Ueta .................. B60N 2/0232 361/31 |
   | 2012/0131367 A1* | 5/2012 | Kamijima ............ H02J 7/0021 713/323 |
   | 2012/0236453 A1 | 9/2012 | Nishizawa et al. |
   | 2013/0141828 A1 | 6/2013 | Yamaguchi et al. |
   | 2013/0163134 A1 | 6/2013 | Ji |
   | 2015/0243958 A1 | 8/2015 | Ro et al. |

OTHER PUBLICATIONS

Vishay, "Dual-Cell Lithium Ion Battery Control IC", dated Jul. 8, 2012 Available at: http://www.vishay.com/docs/70658/si9730.pdf, 15 pages.

* cited by examiner

MULTI-PACK AND COMPONENT CONNECTIVITY DETECTION

BACKGROUND

Many developments have been made to improve the way batteries are used in mobile devices. For instance, some circuits provide safety features in case a battery is exposed to high levels of current. Although there have been some improvements in recent years, there are many shortcomings and inefficiencies when it comes to some current technologies. For example, when a device is designed to have multiple protection circuits and multiple battery packs, most protection circuits are unable to determine if the batteries or other components are properly connected until the components are fully powered. Such designs can lead to an inhibited ability to protect the components of a device, as providing power to components having faulty connections can lead to serious consequences, ranging from unwanted discharge, a short, leakage, or even fire.

In addition to presenting issues during the use of a device, the above-described issues can cause problems in manufacturing or repair scenarios. Similar to the example described above, when relying on some existing technologies, it can be difficult to test the components of a device, or test the connectivity between the components, without operating the components. A range of inefficiencies can result from the use of some existing technologies including, but not limited to, inefficiencies with respect to production and safety.

The disclosure made herein is presented with respect to these and other considerations.

SUMMARY

Techniques for providing multi-pack and component connectivity detection are described herein. In some configurations, a system can include a number of battery packs with a number of protection circuit modules (PCMs) in a parallel configuration. Individual PCMs can test the connectivity between components of a device without the need to operate the components. For example, PCMs configured in accordance with the present disclosure can test the connectivity between a motherboard, a display circuit, a camera, and a number of battery packs without the need to operate the components. In some configurations, conductors that are part of cables and connectors used to connect the components can be used to determine the state of one or more connections. When a signal that runs through the conductors meets one or more criteria, the PCMs can cause a predetermined delay prior to enabling power to one or more components. By testing the connectivity between components before each component transitions to an operating state, problems caused by faulty connections can be mitigated.

In one illustrative example, a system comprises a first protection circuit module, a second protection circuit module, a first battery, and a second battery. In general, the system can include separate battery packs in a parallel configuration with multiple PCMs. In this example, the first PCM comprises one or more inputs, a first control interface, and an output coupled to a first node. An activation of an output signal at an output of a PCM, for example, can cause a switch to transition to a state that can shut down or isolate one or more components of a device, such as a mobile phone, a wearable device, a tablet, etc.

In some configurations, the first PCM can default to a disabled state, and while in the disabled state, the output of the first PCM can disable a first switch. The first switch, for example, can be a transistor controlling a connectivity path between two nodes. In one illustrative example, the first switch can control a connectivity path between a power source and one or more components of a device. Thus, when the first switch is disabled, the one or more components controlled by the first switch can be isolated or shut down.

In response to receiving an activated signal at the first control interface, e.g., a GPIO of the first PCM, the first PCM waits for a predetermined time. After the predetermined time has lapsed, the first PCM becomes enabled, e.g., the first PCM transitions to an operating state. While in the operating state, the first PCM can enable the first switch. When the first switch is enabled, one or more components can be powered and operated. In addition, while in the operating state, the first PCM can monitor the one or more inputs and transition to a fault state when a value of a signal at the one or more inputs of the first PCM meets or exceeds one or more thresholds.

The first PCM can also transition back to the disabled state in response to one or more events. For example, in response to receiving a deactivated signal at the first control interface, the first PCM can transition back to the disabled state.

Similar to the first PCM, the second PCM can default to a disabled state, and while in the disabled state, the second PCM can generate an output to disable a second switch. The second switch, for example, can be a transistor controlling a connectivity path between two nodes. For example, the second switch can control the connectivity path between a power source and one or more components of a device. Thus, when the second switch is disabled, the one or more components can be isolated or shut down.

In response to receiving an activated signal at a second control interface, e.g., a GPIO of the second PCM, the second PCM waits for a predetermined time. After the predetermined time, the second PCM becomes enabled, e.g., the second PCM transitions to an operating state. While in the operating state, the second PCM can enable the second switch. When the second switch is enabled, the one or more components controlled by the second switch can be powered and operated. In addition, while in the operating state, the second PCM can monitor the one or more inputs and transition to a fault state when a value of a signal at the one or more inputs of the second PCM meets or exceeds one or more thresholds.

The second PCM can also transition back to the disabled state in response to one or more events. For example, in addition, in response to receiving a deactivated signal at the second control interface, the second PCM can transition back to the disabled state.

The PCMs are configured to detect fault conditions, such as over voltage, under voltage, excess current, etc. The PCMs can be configured to detect other types of fault conditions based on a temperature of a device and/or component. Thus, for illustrative purposes, the one or more thresholds described herein can be based on any suitable unit of measure, which may include, but is not limited to, voltage, current, temperature, humidity, and pressure. Although the examples disclosed herein disclose PCMs having an output controlling switches, it can be appreciated that the PCMs can control other types of components of a device.

The first battery comprises a cathode coupled to the first control interface through a first resistive component, e.g., a resistor, and the anode of the first battery is coupled to a ground node. An activated signal is received at the first control interface when a first conductor routed through one or more components of a device couples the first control interface to a ground node at the second PCM. Thus, the first PCM can transition to an operating state when first conductor routed through one or more components makes a connection with the ground node at the second PCM.

In some configurations, a deactivated signal is received at the first control interface when the first conductor routed through one or more components does not couple the first control interface with the ground node at the second PCM. Thus, the first PCM can transition back to, or remains in, the disabled state when first conductor does not couple the first control interface with the ground node at the second PCM.

The second battery comprises a cathode coupled to the second control interface through a second resistive component, and the anode of the second battery is coupled to the ground node. The resistors described herein can be any suitable value for causing a voltage drop at a GPIO when the node at the GPIO is grounded. An activated signal is received at the second control interface when a second conductor routed through the one or more components of the device couples the second control interface to a ground node at the first protection circuit module. Thus, the second PCM can transition to an operating state when second conductor routed through one or more components makes a connection with the ground node at the first PCM.

In some configurations, a deactivated signal is received at the second control interface when the second conductor routed through one or more components does not couple the second control interface with the ground node at the first PCM. Thus, the second PCM can transition back to, or remains in, the disabled state when second conductor routed through one or more components does not couple the second control interface with the ground node at the first PCM.

The conductors can run in parallel with other conductors used to power and/or operate the components. Testing the connectivity of the conductors routed through one or more components can provide an indication that other conductors that are connected in a parallel confutation are properly connected. The individual PCMs are configured to delay the operating state to ensure connections are properly in place before power is supplied to the one or more components.

As summarized above, many benefits can result, and many problems can be avoided, when the connectivity of the conductors and the existence of individual batteries are tested prior to the operation of a device. For example, configurations disclosed herein can determine when a device is assembled as designed before the device is turned on. Among many other benefits, the configurations disclosed herein can determine if cables coupling components of a device have a fault, or if connectors at the end of the cables have not been properly secured.

In a mobile device with multiple battery packs it can be beneficial to ensure that parts of the device are connected before power is enabled to each part. This prevents damage that can occur during manufacturing and improves safety should the system become damaged during use. In addition, in an end-user scenario, it can also be beneficial to determine if a number of select components remain connected during use.

It should be appreciated that the above-described subject matter may also be implemented as part of an apparatus, system, or as part of an article of manufacture. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. References made to individual items of a plurality of items can use a reference number with a letter of a sequence of letters to refer to each individual item. Generic references to the items may use the specific reference number without the sequence of letters.

DETAILED DESCRIPTION

In the following detailed description, reference is made to the accompanied drawings, which form a part hereof, and which is shown by way of illustration, specific example configurations of which the concepts can be practiced. These configurations are described in sufficient detail to enable those skilled in the art to practice the techniques disclosed herein, and it is to be understood that other configurations can be utilized, and other changes may be made, without departing from the spirit or scope of the presented concepts. The following detailed description is, therefore, not to be taken in a limiting sense, and the scope of the presented concepts is defined only by the appended claims. For example, some examples illustrate a system having two batteries but it can be understood that the techniques described herein can be applied to systems will more than two batteries and more than two PCMs.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means a direct electrical connection between the items connected, or an indirect connection through one or more passive or active intermediary devices and/or components. The terms "circuit" and "component" means either a single component or a multiplicity of components, either active and/or passive, that are coupled to provide a desired function. The term "signal" means at least a wattage, current, voltage, or data signal. The terms, "gate," "drain," and "source," can also mean a "base," "collector" and "emitter," and/or equivalent parts.

In general, the techniques disclosed herein provide multi-pack and component connectivity detection. In some configurations, a system can include a number of battery packs with a number of protection circuit modules (PCMs) in a parallel configuration. Individual PCMs can test the connectivity between components of a device without the need to operate, or provide power to, components of a device. For example, PCMs configured in accordance with the present disclosure can test the connectivity between a motherboard, a display circuit, a camera, and a number of battery packs without the need to provide power to the components or without the need to operate the components. By testing the connectivity between components before each component transitions to an operating state, problems caused by faulty connections can be mitigated.

Figure 1:
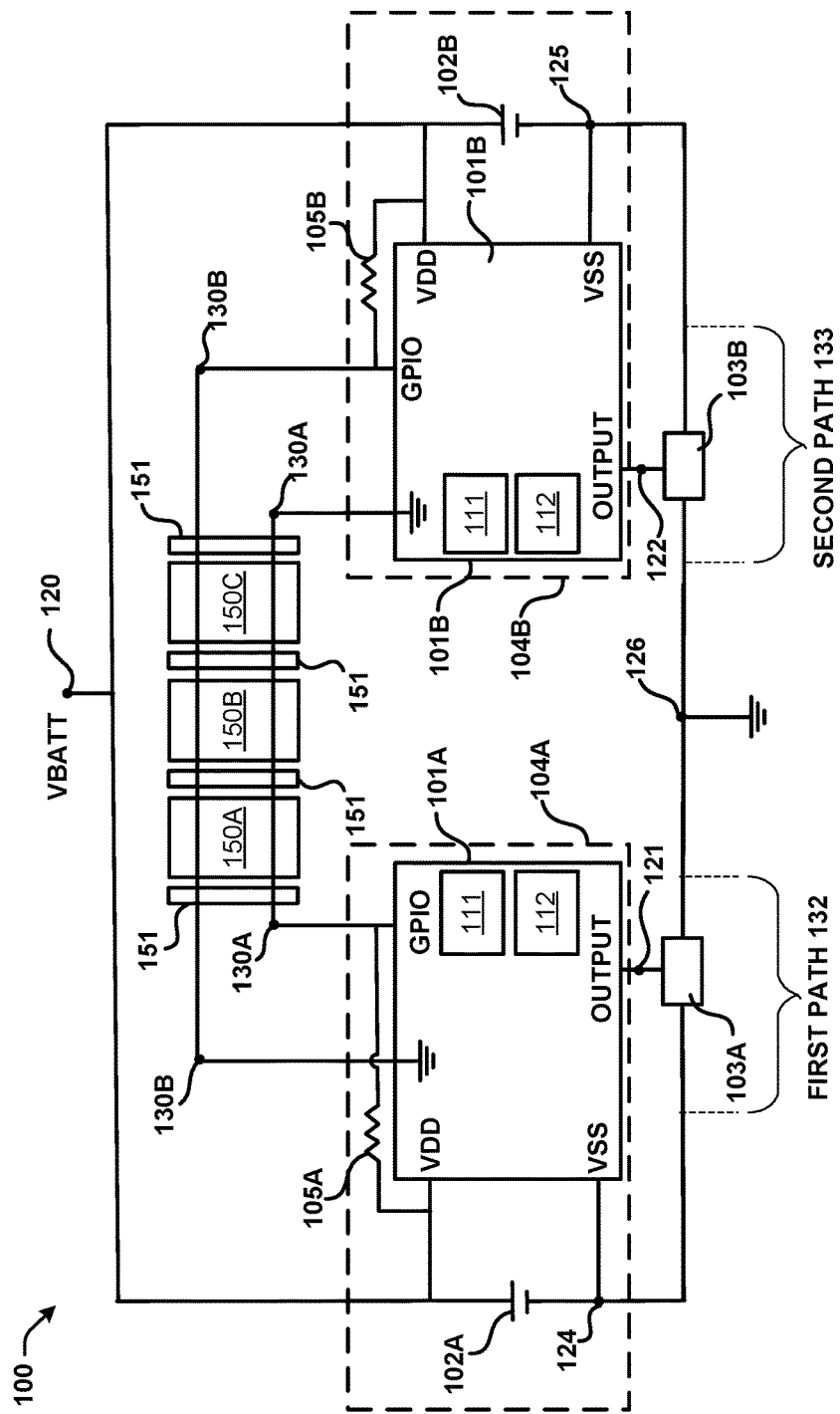
FIG. 1 shows a schematic diagram of system for providing multi-pack and component connectivity detection.

FIG. 1 shows a schematic diagram of a parallel protection circuit 100, also referred to herein as a "circuit 100" or a "system 100." As shown, the circuit 100 includes a first PCM 101A and a second PCM 101B, both of which can be individually and generically referred to herein as a "PCM 101." In addition, the circuit 100 can include a first battery 102A and a second battery 102B, both of which can be individually and generically referred to herein as a "battery 102." In some configurations, the circuit 100 can include a first battery pack 104A housing the first PCM 101A and the first battery 102A, and a second battery pack 104B housing the second PCM 101B and the second battery 102B. As will be described in more detail below, the various components 150 of the circuit 100 can be enabled when both battery packs 104 are suitably connected to the components 150 for operation. It can be appreciated that this example circuit 100 is provided for illustrative purposes and is not to be construed as limiting. Techniques, system, and apparatuses disclosed herein can be applied to any suitable circuit 100 having two or more PCMs 101 and any number of batteries 102.

In some configurations, the individual PCMs 101 include one or more inputs and at least one output. The PCMs 101 are configured to transition to a fault state when a value of a signal at the one or more inputs meets or exceeds one or more thresholds. For example, an individual PCM 101 can have one or more sensors 111 to detect a voltage and/or current with respect to a first input (VDD) and/or a second input (VSS). Any suitable threshold or combination of suitable thresholds can be used with the techniques disclosed herein. For example, a threshold for preventing a voltage and/or current that is capable of damaging at least one battery 102 or any other component can be used with the techniques disclosed herein. The one or more sensors 111 can be configured to detect a temperature, humidity levels, air pressure or any other condition that can affect the circuit 100. For illustrative purposes, the components 150 can be any suitable electronic part such as a motherboard, a display circuit, a camera, etc.

To facilitate aspects of the present disclosure, an individual PCM 101 can also include a general-purpose input/output (referred to herein as a "GPIO" or a "control interface"). In some configurations, the GPIO of each PCM 101 can be coupled to a conductor 130 routed through one or more components 150 of a device. In some configurations, a conductor 130 is routed through several components 150 and several connectors 151 used to hold the conductor 130 in a desired position.

For illustrative purposes, a first conductor 130A couples the control interface of the first PCM 101A to a ground node at the second PCM 101B. In addition, a second conductor 130B couples the control interface of the second PCM 101B to a ground node at the first PCM 101A. The conductors can be routed through the components 150. Connectors 151, e.g., jacks, can be used to fasten the conductors 130 in a desired configuration.

The GPIO of each PCM 101 can function in two modes: (1) an input mode for detecting the presence of an activated control signal or detecting the presence of a deactivated control signal; and (2) an output mode for generating an activated control signal or generating a deactivated control signal. While the GPIO is in input mode, an activated control signal can be at a low level, e.g., 0 volts or less than a volt, and a deactivated control signal can be at high level, e.g., greater than 2 volts. While the GPIO is in output mode, an output control signal can be at a high level, e.g., greater than 2 volts, or at a low level, e.g., 0 volts or less than a volt.

In some configurations, while the GPIO is in input mode, an input signal to the GPIO can control the state of a PCM 101. For example, when a deactivated control signal, e.g., a high signal, is received at the GPIO, the PCM 101 can transition to a disabled state. When an activated control signal, e.g., a low signal, is received at the GPIO, a PCM 101 can transition to an operating state. In some configurations, when an activated control signal is received at the GPIO, a PCM 101 can wait for a predetermined time before transitioning to an operating state. In some configurations, each PCM 101 can transition to a disabled state in response to one or more events, such as the execution of a reset procedure, or when an activated control signal, e.g., a low signal, is received at the GPIO.

When an individual PCM 101 transitions to a disabled state, the PCM 101 activates one or more outputs to control one or more switches 103. In one example, an output of the first PCM 101A is coupled to a first node 121 and an output of the second PCM 101B is coupled to a second node 122. When the first PCM 101A transitions to a disabled state, the first PCM 101A activates the output coupled to the first node 121. Similarly, when the second PCM 101B transitions to a disabled state, the second PCM 101B activates the output coupled to the second node 122. An activation of an output signal, for example, can cause a switch to transition to a state that can shut down or isolate one or more components. In the example of FIG. 1, activation of an output signal at the output of a PCM can cause create an open circuit or a high resistance path in the first path 132 and/or the second path 133. In this example, the first path 132 is between a third node 124, which is at the anode of the first battery 102A, and a ground node 126. Also, in this example, the second path 133 is between a fourth node 125, which is at the anode of the second battery 102B, and the ground node 126.

When an activated signal, e.g., a low signal, is received at the GPIO, a PCM 101 can transition to an operating state. In some configurations, in response to receiving an activated signal at a control interface, a PCM 101 waits for a predetermined time then transitions to an operating state. The predetermined time for each PCM 101 can be the same or they may differ for each component. In some configurations, the signal received at the GPIO is to remain active for the predetermined time in order for a PCM to transition to an operating state. In one illustrative example, the predetermined time can be five (5) seconds. In other examples, the predetermined time can be any time period between 1 and 10 seconds, between 4 and 6 seconds, between 3 and 7 seconds, or between 2 and 8 seconds. In another example, the predetermined time can be any time between 10 and 15 seconds. In another example, the predetermined time can be less than a second or more than 10 seconds. Other suitable predetermined time periods can be used depending on a desired outcome.

In the example of FIG. 1, the first battery 102A comprises a cathode coupled to the first control interface through a first resistive component 105A, e.g., a resistor, and the anode of the first battery 102A is coupled to a ground node. An activated signal is received at the first control interface when a first conductor 130A routed through one or more components 150 couples the first control interface of the first PCM 101A to a ground node at the second PCM 101B. Thus, the first PCM 101A can transition to an operating state when first conductor 130A couples the first control interface of the first PCM 101A to a ground node at the second PCM 101B. In some configurations, the first PCM 101A can transition to an operating state when first conductor 130A couples the first control interface of the first PCM 101A to a ground node at the second PCM 101B for a predetermined time.

In some configurations, a deactivated signal is received at the first control interface when the first conductor 130A routed through one or more components does not couple the first control interface of the first PCM 101A to the ground node at the second PCM 101B. Thus, the first PCM 101A can transition back to, or remain in, the disabled state when first conductor 130A does not couple the first control interface of the first PCM 101A to the ground node at the second PCM 101B.

The second battery comprises 102B a cathode coupled to the second control interface through a second resistive component 105B, and the anode of the second battery 102B is coupled to the ground node. The resistors described herein can be any suitable value for causing a voltage drop at a GPIO when the node at the GPIO is grounded. An activated signal is received at the second control interface when a second conductor 130B routed through the one or more components 150 couples the second control interface to a ground node at the first PCM 101A. Thus, the second PCM 101B can transition to an operating state when the second conductor 130B couples the second control interface to a ground node at the first PCM 101A. In some configurations, the second PCM 101B can transition to an operating state when the second conductor 130B couples the second control interface to a ground node at the first PCM 101A for a predetermined time.

In some configurations, a deactivated signal at the second control interface is received when the second conductor 130B does not couple the second control interface of the second PCM 101B to the ground node at the first PCM 101A. Thus, the second PCM 101B can transition back to the disabled state when second conductor 130B does not couple the second control interface of the second PCM 101B to the ground node at the first PCM 101A.

For illustrative purposes, the individual conductors 130 can couple conductive elements of one or more electronic components 150. For instance, a conductor 130 can include a first cable having a jack that plugs into a first receiving unit of a motherboard, and a second cable having a jack that plugs into a second receiving unit of a motherboard. When the jacks are properly secured to the receiving units of motherboard, the two cables create one conductor 130, one end of which can be connected to a GPIO of a first PCM and the other end can be connected to a ground node of a second PCM.

Figure 3:
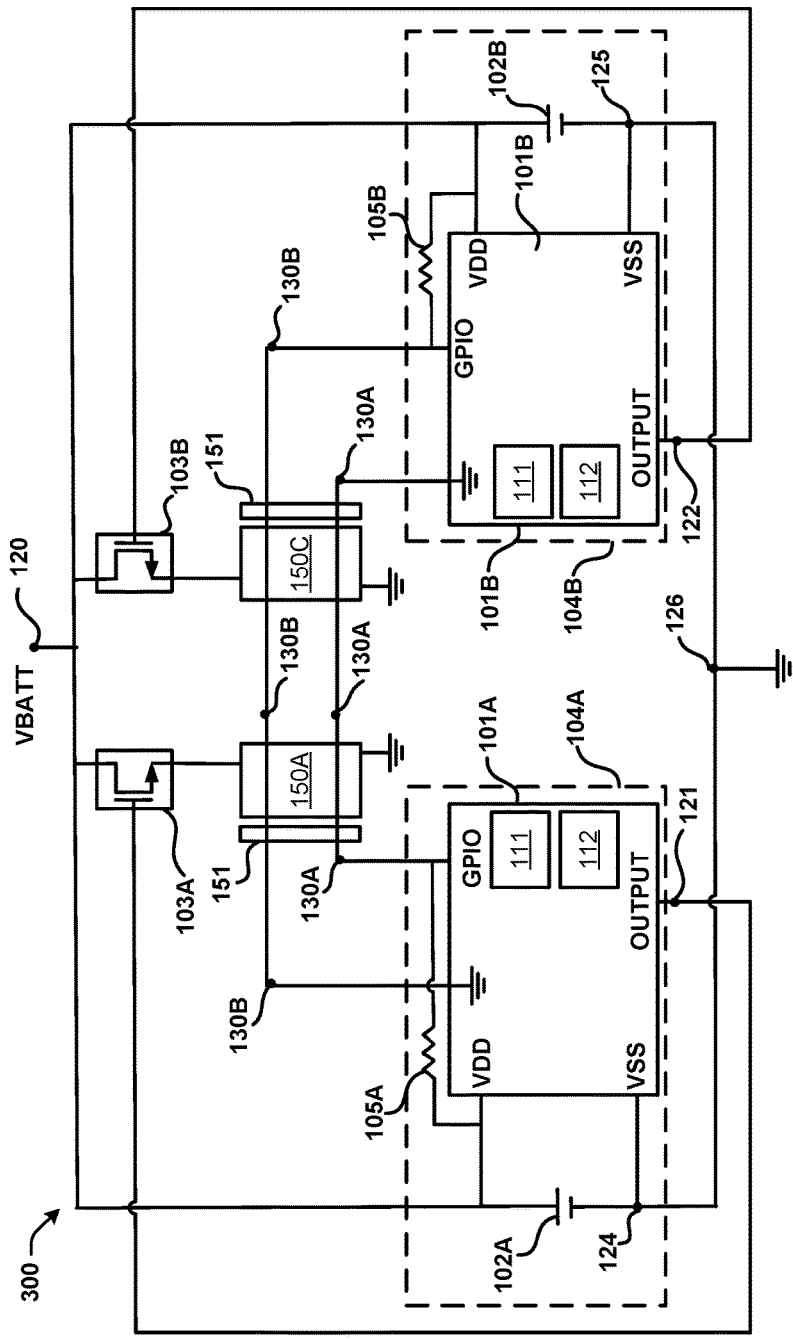
FIG. 3 shows a schematic diagram of another circuit for enabling multi-pack and component connectivity detection.

Referring now to FIG. 3, another circuit 300 for enabling multi-pack and component detection is shown. In this example, the circuit 300 comprises a first PCM 101A, a second PCM 101B, a first battery 102A, a second battery 102B, a number of switches 103, a number of components 150, and a number of connectors 151. In this example, the switches 103 control power supplied to the components 150.

The first PCM comprises one or more inputs (VDD and VSS), a first control interface (GPIO), and an output coupled to a first node 121. In this example, it is a given that first PCM 101A starts in a disabled state. While in the disabled state, the first PCM 101A can generate a signal at the output to disable a first switch 103A. The first switch 103A, for example, can be a transistor controlling a connectivity path between the power source node 120 and a first component 150A. In this example, when the second switch 103B is disabled, the first component 150A can be isolated or shut down.

In this example, when the battery packs 104 are properly coupled to the components, which can utilize the connectors 151, an activated signal is received at both the first control interface and the second control interface.

In response to receiving an activated signal at the first control interface, the first PCM 101A waits for a predetermined time. After the predetermined time, the first PCM 101A becomes enabled, e.g., the first PCM 101A transitions to an operating state. While in the operating state, the first PCM 101A can enable the first switch 103A. When the first switch 103A is enabled, the first component 150A is powered.

While in the operating state, the first PCM 101A can monitor the one or more inputs and transition to a fault state when a value of a signal at the one or more inputs of the first PCM meets or exceeds one or more thresholds. In the fault state, the first PCM 101A can disable the first switch 103A. In addition, in response to receiving a deactivated signal at the first control interface, the first PCM 101A can transition back to the disabled state. In the disabled state, the first PCM 101A can disable the first switch 103A.

The second PCM 101B comprises one or more inputs (VDD and VSS), a second control interface (GPIO), and an output coupled to a second node 122. In this example, it is a given that second PCM 101B starts in a disabled state. While in the disabled state, the second PCM can generate a signal at the output to disable the second switch 103B. The second switch 103B, for example, can be a transistor controlling a connectivity path between the power source node 120 and one or more components 150. In this example, when the second switch 103B is disabled, the one or more components 150C can be isolated or shut down.

In response to receiving an activated signal at a second control interface, e.g., a GPIO of the second PCM 101B, the second PCM 101B waits for a predetermined time. After the predetermined time, the second PCM 101B becomes enabled, e.g., the second PCM 101B transitions to an operating state. While in the operating state, the second PCM 101B can enable the second switch 103B. When the second switch 103B is enabled, the one or more components can be powered and operated.

While in the operating state, the second PCM 101B can monitor the one or more inputs and transition to a fault state when a value of a signal at the one or more inputs of the second PCM 101B meets or exceeds one or more thresholds. In the fault state, the second PCM 101B can disable the second switch 103B. In addition, in response to receiving a deactivated signal at the second control interface, the second PCM 101B can transition back to the disabled state. In the disabled state, the second PCM 101B can disable the second switch 103B.

The PCMs are configured to detect fault conditions, such as over voltage, under voltage, excess current, etc. The PCMs can be configured to detect other types of fault conditions based on a temperature of a device and/or component. Thus, for illustrative purposes, the one or more thresholds described herein can be based on any suitable unit of measure, which may include, but is not limited to, voltage, current, temperature, humidity, and pressure. Although the examples disclosed herein disclose PCMs having an output controlling switches, it can be appreciated that the PCMs 101 can control other types of components of a device.

In this example, the first battery 102A comprises a cathode coupled to the first control interface through a first resistive component 105A, e.g., a resistor, and the anode of the first battery 102A is coupled to a ground node. An activated signal is received at the first control interface when a first conductor 130A routed through one or more components 150 couples the first control interface to a ground node at the second PCM 101B. Thus, the first PCM 101A can transition to an operating state when first conductor routed through one or more components makes a connection with the ground node at the second PCM 101B.

A deactivated signal is received at the first control interface when the first conductor routed through one or more components no longer makes a connection with the ground node at the second PCM 101B. Thus, the first PCM 101A can transition back to the disabled state when first conductor routed through one or more components no longer makes a connection with the ground node at the second PCM 101B.

The second battery comprises 102B a cathode coupled to the second control interface through a second resistive component 105B, and the anode of the second battery 102B is coupled to the ground node. The resistors described herein can be any suitable value for causing a voltage drop at a GPIO when the node at the GPIO is grounded. An activated signal is received at the second control interface when a second conductor 130B routed through the second component 150B couples the second control interface to a ground node at the first PCM 101A. Thus, the second PCM 101B can transition to an operating state when second conductor 130B couples the second control interface to a ground node at the first PCM 101A.

A deactivated signal at the second control interface is received when the second conductor 130B does not couple, e.g., there is an open circuit between, the second control interface to a ground node at the first PCM 101A. Thus, the second PCM 101B can transition back to the disabled state when second conductor 130B does not couple the second control interface to a ground node at the first PCM 101A.

The conductors 130 can run in parallel with other conductors used to power and/or operate the components. Testing the connectivity of the conductors 130, which are routed through components can provide an indication that other conductors that are connected in a parallel configuration with the conductors 130 are properly connected. The individual PCMs are configured to delay the operating state to ensure connections are properly in place before the PCMs control aspects of a device, e.g., power is supplied to the one or more components.

For illustrative purposes, "activation" of the signal feeding the GPIO can include a transition of the control signal from a high level to a low level. For example, an activated signal is received at the first control interface (GPIO of the first PCM 101A) when a first conductor 130A routed through one or more components 150 of a device is coupled to a ground node pin at the second PCM 101B. In addition, an activated signal is received at the second control interface (the GPIO of the second PCM 101B) when a second conductor 130B routed through one or more components 150 of the device is coupled to a ground node pin at the first PCM 101A. The signal levels described herein are used for illustrative purposes and are not to be construed as limiting. It can be appreciated that an "activation" or a "deactivation" can involve other suitable levels.

Figure 2:
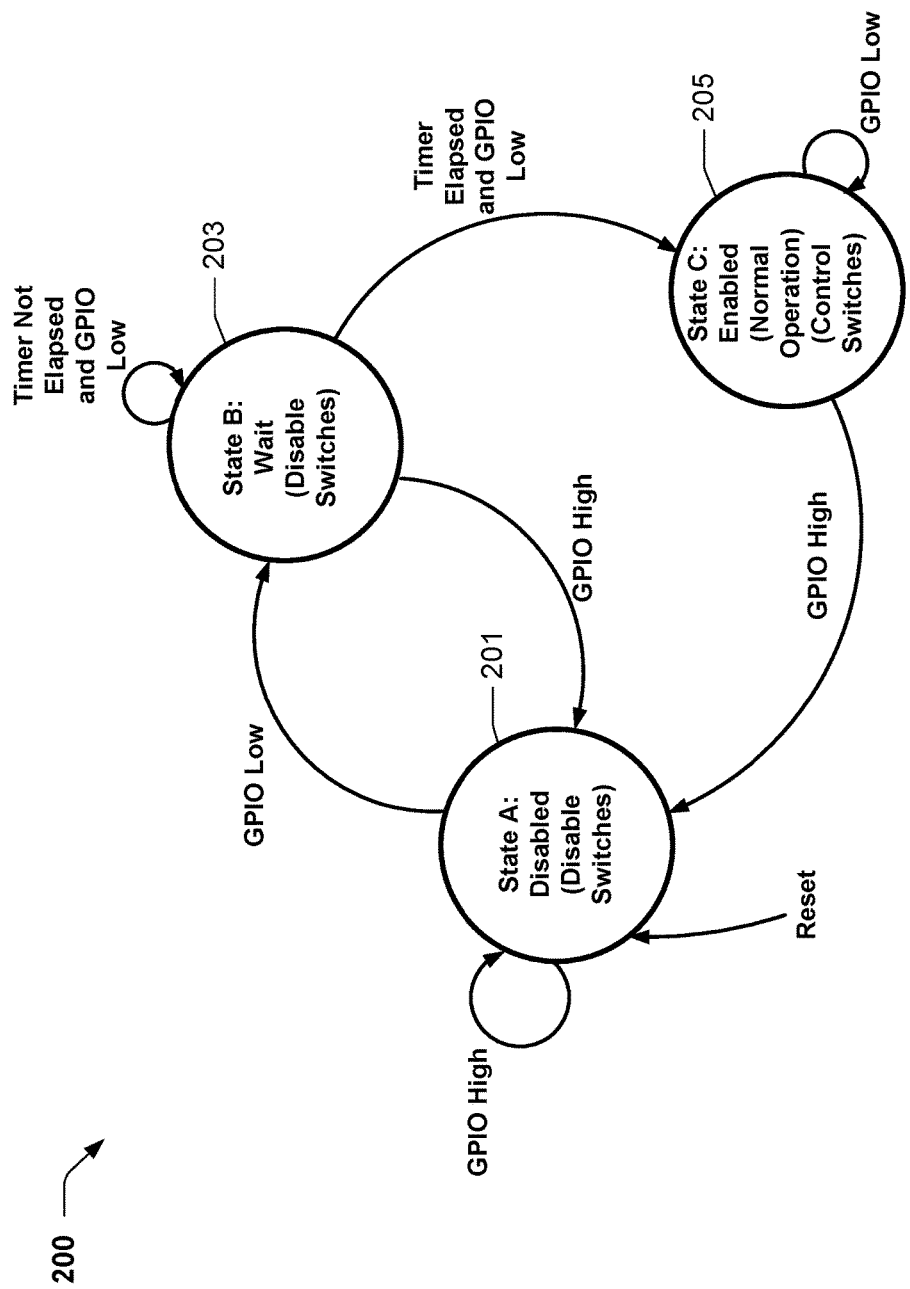
FIG. 2 shows a state diagram illustrating aspects of a system for providing multi-pack and component connectivity detection.

The aspects of the state diagram of FIG. 2 can be utilized by a state machine 112 of a PCM 101. As shown in FIG. 2, a PCM can have at least three states. Generally described, in State A, a PCM 101 is in a "disabled state," e.g., "not enabled," while a signal received at the GPIO remains high. In the disabled state, an output of the PCM 101 causes the switches 103 to be disabled, thus shutting down one or more components of a device. In State B, a PCM 101 is in a "wait" state. While in the wait state, a timer enables the PCM 101 to wait for a predetermined time, where the timer is triggered by a transition of a signal received at the GPIO, e.g., a transition from a high signal to a low signal. While the timer has not elapsed, the output of the PCM 101 causes the switches 103 to be disabled. In some configurations, the timer runs while the signal received at the GPIO remains low. If the signal received at the GPIO does not remain low, the timer can reset. In State C, a PCM 101 is in a "normal operating state," which occurs while the signal received at the GPIO remains low and after the timer has elapsed. A PCM 101 can transition from State C to State A when the signal received at the GPIO transitions to a high signal. A PCM 101 can also start in State A in response to a device reset.

It can be appreciated that the switches 103 can control paths of connectivity between any nodes of a device. For example, which is shown in FIG. 3, the controlled paths of connectivity can be between a power source and one or more components 150. In another example, the switches 103 can control paths of connectivity between a power source node 120 and two batteries. In yet another example, the first switch 103A can be configured to control the connection between the cathode of the first battery 102A and a power source node 120 ("VDD").

Also shown in FIG. 3, aspects of the switches 103 are shown. In one illustrative example, the circuit 300 comprises a first transistor as the first switch 103A and a second transistor as the second switch 103B. In this example configuration, the gate of the first transistor is coupled to the first node 121, the source of the first transistor is coupled to the cathode of the first battery 102A, and the drain of the first transistor is coupled to a power input node of the first component 150A. In addition, the gate of the second transistor is coupled to the second node 122, the source of the first transistor is coupled to the cathode of the second battery 102B, and the drain of the first transistor is coupled to a power input node of the second component 150B.

Figure 4A:
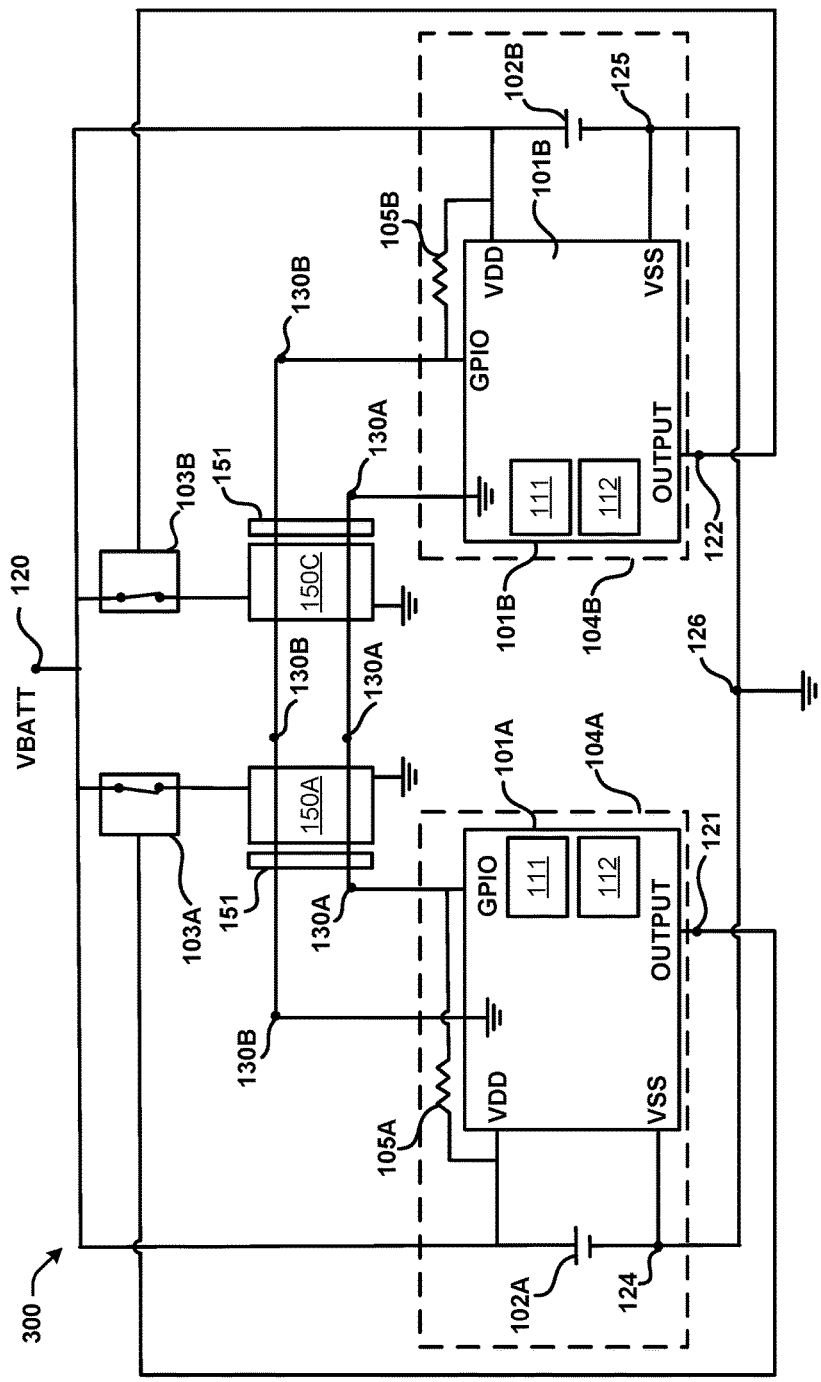
FIGS. 4A and 4B illustrate an example scenario showing representations of two switches that are controlled by protection circuit modules configured in accordance with the techniques disclosed herein.
Figure 4B:
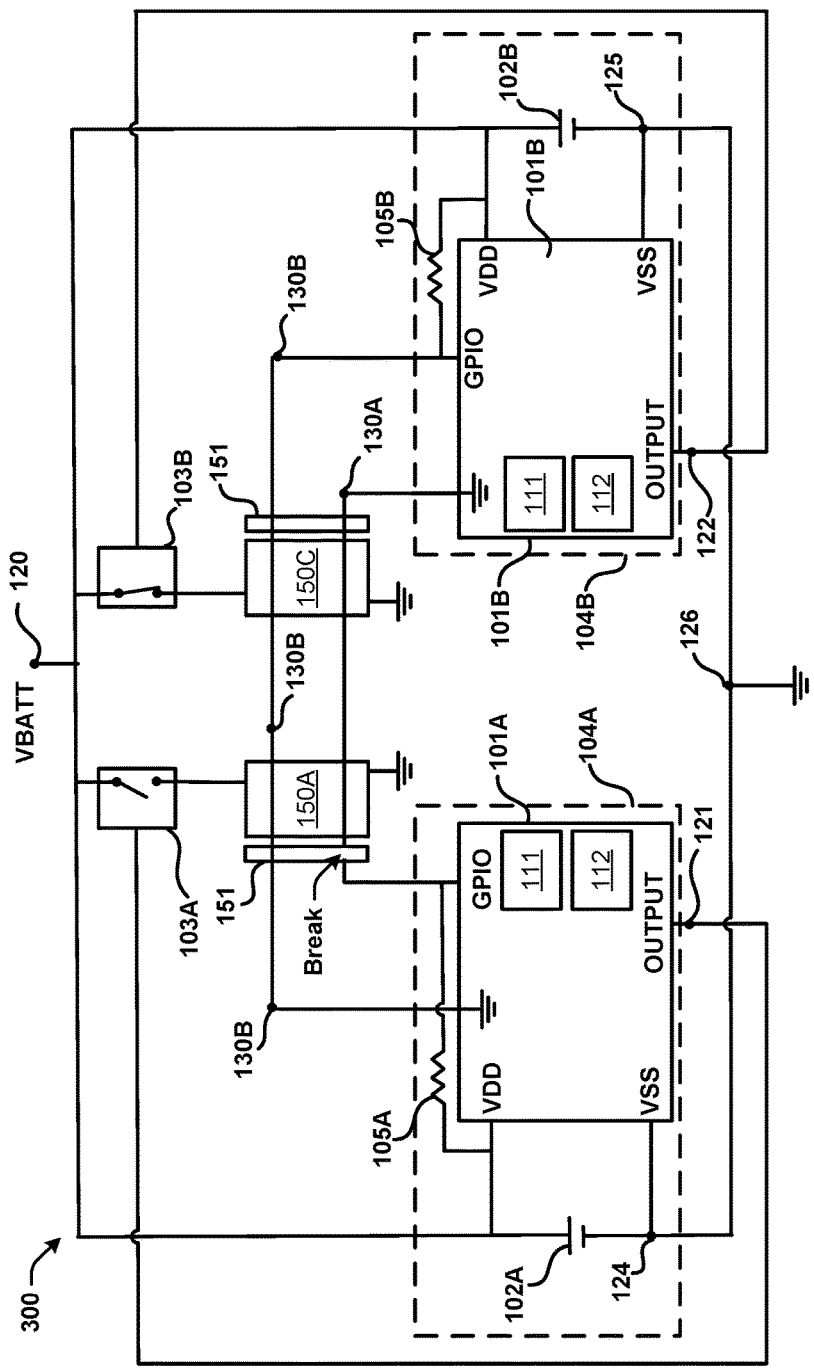

FIGS. 4A and 4B illustrate an example scenario showing representations of two switches that are controlled by protection circuit modules configured in accordance with the techniques disclosed herein. As shown in FIG. 4A, the first conductor 130A maintains connectivity between the first control interface and the ground node at the second protection circuit module 101B. In addition, the second conductor 130B maintains connectivity between the second control interface and the ground node at the first protection circuit module 101A. Thus, both protection circuit modules are in an enabled state, and the switches 103 are closed.

As shown in FIG. 4B, in this example, a break is created in the first conductor 130A, thereby breaking the connectivity between the first control interface and the ground node at the second protection circuit module 101B. When the connectivity between the first control interface and the ground node is broken, the first battery 102A causes a high signal at the first control interface, further causing the first protection circuit 101A module to transition to a disabled state. As a result, in the disabled state, the first protection circuit 101A generates an output causing the first switch 103A to transition to an open circuit, isolating the first component 150A. However, in this example, since the connectivity between the second control interface and the ground node at the first protection circuit module is maintained, the second protection circuit module 101B does not cause the second switch 103B to transition to an open circuit.

In this example, when the break is repaired, e.g., the connectivity between the first control interface and the ground node at the second protection circuit module 101B is restored, the first protection circuit module 101A is configured to wait for a predetermined time before transitioning back to the operating state. In such a scenario, once the predetermined time has lapsed, the first protection circuit module 101A transitions to the operating state and generates an output causing the first switch 103A to transition to a closed circuit, thus enabling the first component 150A.

Figure 5:
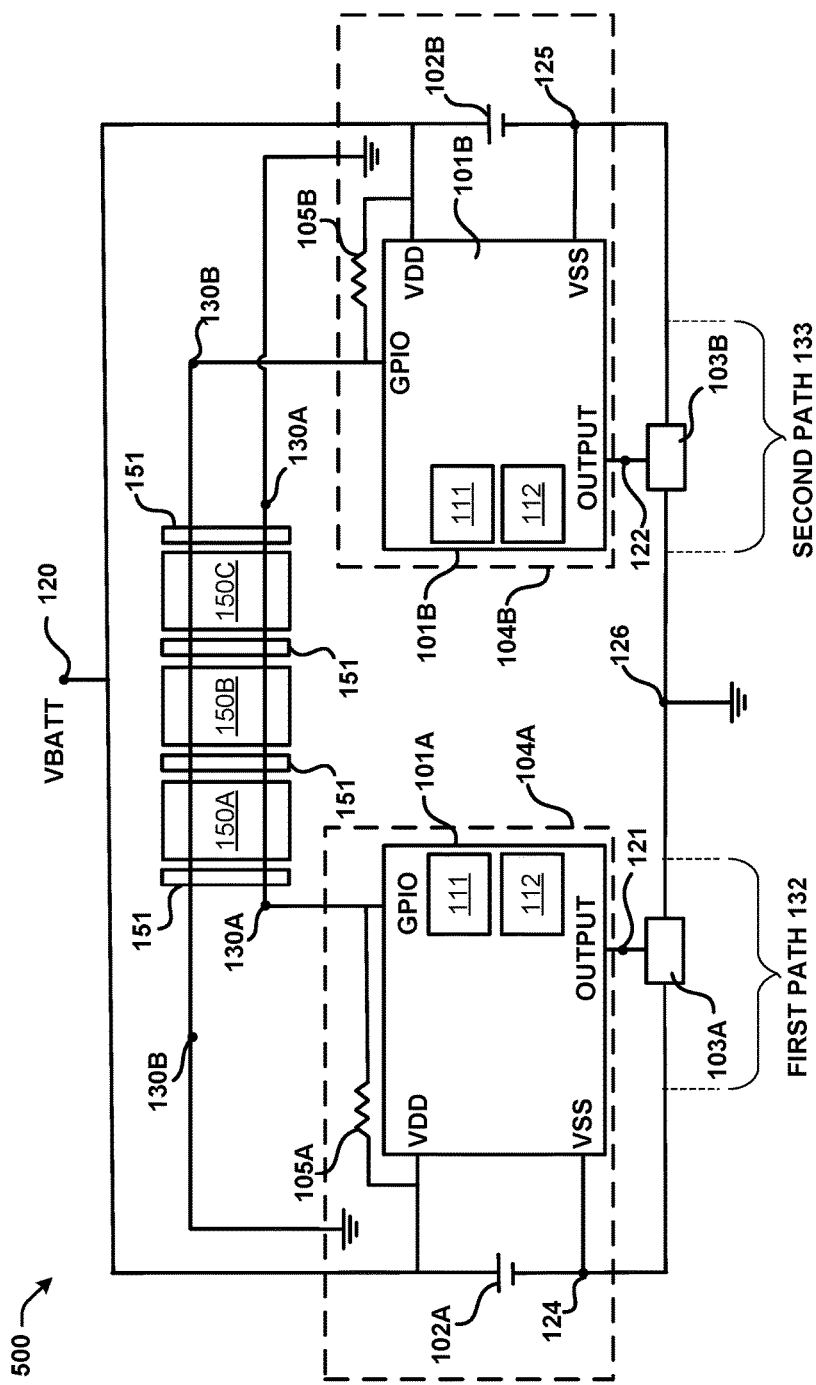
FIG. 5 shows a schematic diagram of a circuit for enabling multi-pack and component connectivity detection, the circuit having conductors that are grounded at the battery packs.

Although the examples disclosed herein illustrate configurations where the conductors 130 couple a control interface (GPIO) of one PCM 101 to a ground node at another PCM 101, the conductors 130 can couple a control interface (GPIO) of one PCM 101 to a ground node at any other suitable component. For example, as shown in the example circuit 500 of FIG. 5, the first conductor 130A couples the control interface of the first PCM 101A to a ground node at the second battery pack 104B. Also in this example, the second conductor 130B couples the control interface of the second PCM 101B to a ground node at the first battery pack 104A.

The above specification, examples and data provide a complete description of the manufacture and use of the composition of the invention. Since many embodiments of the invention can be made without departing from the spirit and scope of the invention, the invention resides in the claims hereinafter appended.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system, comprising:
a first protection circuit module comprising one or more inputs, a first control interface, and a first output coupled to a first node, wherein the first protection circuit module defaults to a disabled state, and while in the disabled state, the first protection circuit module disables a first switch coupled to the first node, and in response to receiving a first activated signal at the first control interface for a predetermined time, the first protection circuit module transitions to an operating state, and while in the operating state, the first protection circuit module enables the first switch and monitors the one or more inputs, and while in the operating state, the first output disables the first switch when value of the signal at the one or more inputs of the first protection circuit module meets or exceeds one or more thresholds;
a second protection circuit module comprising one or more inputs, a second control interface, and a second output coupled to a second node, wherein the second protection circuit module defaults to the disabled state, and while in the disabled state, the second protection circuit module disables a second switch coupled to the second node, and in response to receiving a second activated signal at the second control interface for the predetermined time, the second protection circuit module transitions to the operating state, and while in the operating state, the second protection circuit module enables the second switch coupled to the second node and monitors the one or more inputs, and while in the operating state, the second output disables the second switch when a value of a signal at the one or more inputs of the second protection circuit module meets or exceeds the one or more thresholds;
a first conductor coupling conductive elements of one or more components;
a first battery having a cathode coupled to the first control interface through a first resistive component, wherein the first battery comprises an anode coupled to a ground node, wherein the first activated signal is received at the first control interface when the first conductor couples the first control interface to a ground node at the second protection circuit module;
a second conductor coupling the conductive elements of the one or more components or conductive elements of other components; and
a second battery having a cathode coupled to the second control interface through a second resistive component, wherein the second battery comprises an anode coupled to a ground node, wherein the second activated signal is received at the second control interface when the second conductor couples the second control interface to a ground node at the first protection circuit module.

2. The system of claim 1, wherein the first protection circuit module transitions to the disabled state in response to receiving a deactivated signal at the first control interface, wherein the deactivated signal is received at the first control interface when there is an open circuit between the first control interface to a ground node at the second protection circuit module.

3. The system of claim 1, wherein the second protection circuit module transitions to the disabled state in response to receiving a deactivated signal at the second control interface, wherein the deactivated signal is received at the second control interface when there is an open circuit between the second control interface to a ground node at the first protection circuit module.

4. The system of claim 1, while the first protection circuit module is in the operating state, the first output enables the first switch when the value of the signal at the one or more inputs of the first protection circuit module does not meet or does not exceed one or more thresholds.

5. The system of claim 1, and while in the operating state, the second output enables the second switch when the value of the signal at the one or more inputs of the second protection circuit module does not meet or does not exceed the one or more thresholds.

6. The system of claim 1, wherein the predetermined time is within a range of 4 to 6 seconds.

7. The system of claim 1, wherein the predetermined time is within a range of 2 to 7 seconds.

8. The system of claim 1, wherein the predetermined time is 5 seconds.

9. A protection circuit module comprising one or more inputs, a control interface, and an output coupled to a node, wherein the protection circuit module transitions to a disabled state upon startup, and while in the disabled state, the protection circuit module generates an activated output signal at the output, and in response to receiving an activated signal at the control interface for a predetermined time, the protection circuit module transitions to an operating state, and while in the operating state, the protection circuit module generates a deactivated output signal at the output and monitors the one or more inputs, and while in the operating state, the protection circuit module generates the activated output signal at the output when a value of a signal received at the one or more inputs meets or exceeds one or more thresholds, wherein the control interface is coupled to a conductor routed through one or more components of a device, wherein the conductor comprises a series of conductive elements coupled through the one or more components, wherein the conductor is coupled to a ground node at a component of the one or more components, wherein the component is a first battery pack, and wherein the control interface is coupled to a cathode of a second battery pack through a resistor.

10. The protection circuit module of claim 9, wherein the predetermined time is within a range of 4 to 6 seconds.

11. The protection circuit module of claim 9, wherein the predetermined time is within a range of 2 to 7 seconds.

12. The protection circuit module of claim 9, wherein the predetermined time is 5 seconds.

13. The protection circuit module of claim 9, wherein an input of a switch is coupled to the node, wherein the switch causes a high resistance path or an open circuit between two nodes when the protection circuit module generates the activated output signal, and wherein the switch causes a low resistance path or a closed circuit between the two nodes when the protection circuit module generates the deactivated output signal.

14. The protection circuit module of claim 9, wherein a break in the conductor causes an increase in a voltage at the control interface, the increase in the voltage at the control interface causes the protection circuit module to transition to a disable state.

15. A method, comprising:
transitioning a protection circuit module to a disabled state;
generating an activated output signal at an output of the protection circuit module;
receiving, at a control interface of the protection circuit module, an activated signal from a conductor routed through one or more components of a device;
causing a wait state for a predetermined time, wherein the wait state runs while the activated signal is received at the control interface;
transitioning the protection circuit module to an operating state after the wait state; and
while in the operating state,
generating a deactivated output signal at the output, and
generating the activated output signal at the output when a value of a signal received at the one or more inputs meets or exceeds one or more thresholds, wherein the control interface is coupled to a conductor routed through the one or more components of the device, wherein the conductor is coupled to a ground node at a component of the one or more components, wherein the control interface is coupled to a cathode of a battery pack through a resistor, wherein a break in the conductor causes an increase in a voltage at the control interface, the increase in the voltage at the control interface causes the protection circuit module to transition to a disable state and generate the activated output.

16. The method of claim 15, further comprising:
receiving, at the control interface of the protection circuit module, a deactivated signal from the conductor routed through the one or more components;
transitioning a protection circuit module to the disabled state; and
generating the activated output signal at the output of the protection circuit module.

17. The method of claim 15, wherein the deactivated output signal controls a switch to cause a high impedance path, or an open circuit, between two nodes, thereby causing an electronic isolation of at least one component of the one or more components.

18. The method of claim 15, wherein the predetermined time is within a range of 4 to 6 seconds.

19. The method of claim 15, wherein the predetermined time is within a range of 2 to 7 seconds.

20. The method of claim 15, wherein the predetermined time is 5 seconds.

* * * * *